(12) United States Patent
Razumov (10) Patent No.: US 8,690,510 B1
(45) Date of Patent: Apr. 8, 2014

(54) SELF-LIFTING ROBOTIC DEVICE MOVABLE IN DESIRED HORIZONTAL DIRECTIONS

(71) Applicant: Sergey N. Razumov, Moscow (RU)

(72) Inventor: Sergey N. Razumov, Moscow (RU)

( * ) Notice: Subject to any disclaimer, the term of this patent is extended or adjusted under 35 U.S.C. 154(b) by 14 days.

(21) Appl. No.: 13/622,056

(22) Filed: Sep. 18, 2012

(51) Int. Cl.
*B65G 1/00* (2006.01)
*B65G 65/00* (2006.01)

(52) U.S. Cl.
USPC ... 414/281; 414/279; 198/468.6; 108/144.11; 901/7

(58) Field of Classification Search
USPC ......... 198/347.4, 463.3, 468.6; 414/279, 281, 414/282, 283, 284, 331.14, 331.17; 108/144.11, 147.11; 700/214, 230; 701/19; 901/7
See application file for complete search history.

(56) References Cited

U.S. PATENT DOCUMENTS

| | | | |
|---|---|---|---|
| 3,351,926 A | | 11/1967 | Watters |
| 4,273,494 A | * | 6/1981 | Swain et al. ................... 414/266 |
| 4,372,219 A | * | 2/1983 | Gibbs ............................ 104/165 |
| 4,395,181 A | * | 7/1983 | Loomer ......................... 414/284 |
| 4,657,463 A | * | 4/1987 | Pipes ............................. 414/495 |
| 4,690,601 A | * | 9/1987 | Delius et al. ................ 414/795.3 |
| 4,856,956 A | * | 8/1989 | Zur ................................ 414/280 |
| 5,139,384 A | * | 8/1992 | Tuttobene ..................... 414/281 |
| 5,213,463 A | * | 5/1993 | Rothlisberger et al. ....... 414/280 |
| 5,433,293 A | * | 7/1995 | Sager ............................ 187/249 |
| 5,501,295 A | * | 3/1996 | Muller et al. ................. 187/406 |
| 5,564,880 A | * | 10/1996 | Lederer ......................... 414/280 |
| 5,658,120 A | * | 8/1997 | Watanabe ...................... 414/495 |
| 5,839,872 A | * | 11/1998 | Goto et al. ..................... 414/280 |
| 5,952,796 A | * | 9/1999 | Colgate et al. ..................... 318/1 |
| 5,967,728 A | * | 10/1999 | Gales et al. .................... 414/284 |
| 6,149,366 A | * | 11/2000 | Deandrea ....................... 414/279 |
| 6,602,039 B1 | * | 8/2003 | Dimitri et al. ................ 414/281 |
| 6,889,813 B1 | * | 5/2005 | Trammell et al. .......... 198/346.3 |
| 6,929,440 B1 | * | 8/2005 | Grond ........................... 414/284 |
| 7,128,521 B2 | * | 10/2006 | Hansl ............................ 414/807 |
| 7,381,022 B1 | * | 6/2008 | King ............................. 414/267 |
| 7,559,738 B2 | * | 7/2009 | Salm et al. .................... 414/799 |
| 7,591,630 B2 | * | 9/2009 | Lert, Jr. ......................... 414/807 |

(Continued)

FOREIGN PATENT DOCUMENTS

FR 1435526 A 4/1966
GB 1163787 A 9/1969

OTHER PUBLICATIONS

International Search Report PCT/IB2013/001758 dated Dec. 6, 2013.

*Primary Examiner* — Douglas Hess
(74) *Attorney, Agent, or Firm* — McDermott Will & Emery LLP; Alexander V. Yampolsky (57) ABSTRACT

A robotic device movable in a vertical direction and in prescribed horizontal directions along rails arranged in the prescribed horizontal directions in multiple rows provided at various levels with respect to ground. The robotic device has a frame, wheels coupled to the frame and configured for moving the frame along the rails, and support handles for lifting the frame in the vertical direction from first rails arranged in a first row of the rails to second rails arranged in a second row of the rails. The support handles are configured for providing engagement with the second rails to lift the robotic device in the vertical direction, and for turning the frame into a desired horizontal direction by pushing against the second rails on an intersection between the second rails and third rails arranged in the same row as the second rails.

19 Claims, 11 Drawing Sheets

(56) References Cited

U.S. PATENT DOCUMENTS

| | | | |
|---|---|---|---|
| 7,753,637 B2 * | 7/2010 | Benedict et al. | 414/140.3 |
| 7,784,407 B2 * | 8/2010 | Di Rosa et al. | 104/48 |
| 7,787,985 B2 * | 8/2010 | Tsujimoto et al. | 700/214 |
| 7,837,424 B2 * | 11/2010 | Solomon | 414/331.04 |
| 7,871,232 B2 * | 1/2011 | Lutz | 414/279 |
| 7,959,396 B2 * | 6/2011 | Izumi | 414/279 |
| 8,105,005 B2 * | 1/2012 | Yoshida et al. | 414/282 |
| 8,403,614 B2 * | 3/2013 | Bastian et al. | 414/282 |
| 8,527,153 B2 * | 9/2013 | Doan | 701/49 |

\* cited by examiner

SELF-LIFTING ROBOTIC DEVICE MOVABLE IN DESIRED HORIZONTAL DIRECTIONS

TECHNICAL FIELD

This disclosure relates to robotics, and more particularly, to a self-lifting robotic device that can move in any desired horizontal directions and can move in a vertical direction without assistance of external lifts.

BACKGROUND ART

Conventional robotic systems include lifts provided for moving robotic devices in a vertical direction. However, the number of lifts in any efficient robotic system employing multiple robots is substantially less than the number of robots. Therefore, "bottlenecks" are created near the lifts, reducing the throughput of the robotic system.

Therefore, there is a need for a new "self-lifting" technique that would enable a robotic device to move in a vertical direction without assistance of an external lift.

A robotic system may be installed in a retail storage facility or warehouse, in which robotic devices would provide access to multiple storage racks. When the retail storage facility or warehouse is provided in an existing building, the storage racks need to be installed in directions defined by walls of rooms in this building. If a room has a non-rectangular shape, one storage rack section has to be installed along a direction which is not orthogonal with respect to a direction of another storage rack section.

To provide access to storage rack sections arranged in non-orthogonal directions, there is a need for a robotic device capable of moving not only in mutually perpendicular horizontal directions, but in any desired horizontal directions.

SUMMARY OF THE DISCLOSURE

In accordance with one aspect, the present disclosure offers a robotic device movable in a vertical direction and in prescribed horizontal directions along rails arranged in the prescribed horizontal directions in multiple rows provided at various levels with respect to ground. The robotic device has a frame, wheels coupled to the frame and configured for moving the frame along the rails, and support handles for lifting the frame in the vertical direction from first rails arranged in a first row of the rails to second rails arranged in a second row of the rails.

The support handles are configured for providing engagement with the second rails to lift the robotic device in the vertical direction, and for turning the frame into a desired horizontal direction by pushing against the second rails on an intersection between the second rails and third rails arranged in the same row as the second rails.

In accordance with an exemplary embodiment, the support handles may be provided on a platform movable in the vertical direction and configured for transferring the frame in the vertical direction when the support handles are engaged with the second rails. Each of the support handles may include an L-shaped pin attached to the movable platform.

In particular, the support handles may be configured for raising the frame with respect to the second rails when the support handles pushes against the second rails.

The robotic device may further have a wheels turning mechanism for turning the wheels with respect to a direction of the second rails when the frame is raised with respect to the second rails.

The wheels turning mechanism may be configured for turning the wheels by angles determined based on dimensions of the robotic device so as to position the wheels for movement along an auxiliary rail provided at the intersection between the second rails and the third rails. The wheels may be placed onto the auxiliary rail when the support handles stop pushing against the second rail.

The frame may be controlled to move along the auxiliary rail until the wheels reach intersection points where the auxiliary rail meets the third rails. The support handles may be configured to push against the third rails when the wheels reach the intersection points where the auxiliary rail meets the third rails.

The support handles may raise the frame with respect to the third rails when the support handles push against the third rails, and the wheels turning mechanism may turn the wheels with respect to the auxiliary rail to position the wheels for movement along the third rails.

In accordance with a further aspect, a method is offered for operating a robotic device having a frame with wheels, and support handles. The method involves:
  rotating the wheels for moving the frame on first rails in a first horizontal direction,
  engaging the support handles with second rails arranged in the first horizontal direction above the first rails,
  moving the frame in a vertical direction using the support handles engaged with the second rails so as to place the wheels on the second rails,
  rotating the wheel for moving the frame on the second rails to an intersection between the second rails and third rails arranged in a second horizontal direction,
  operating the support handles to push against the second rails so as to raise the frame above the second rails, and turning the wheels to move the frame onto the third rails.

The method may further include the step of turning the wheels with respect to a direction of the second rails when the frame is raised with respect to the second rails. The wheels may be turned by angles determined based on dimensions of the robotic device to position the wheels for movement along an auxiliary rail provided at the intersection between the second rails and the third rails. The wheels may be placed onto the auxiliary rail when the support handles stop pushing against the second rail.

The frame may be controlled to move along the auxiliary rail until the wheels reach intersection points where the auxiliary rail meets the third rails.

Pushing against the third rails using the support handles may be performed when the wheels reach the intersection points where the auxiliary rail meets the third rails. The frame may be raised with respect to the third rails when the support handles push against the third rails, so as to enable the wheels to turn with respect to the auxiliary rail to position the wheels for movement along the third rails.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features, wherein.

DETAILED DISCLOSURE OF THE EMBODIMENTS

The present disclosure will be made using exemplary embodiments described in the present disclosure. It will become apparent, however, that the concept of the disclosure is applicable to any robotic device movable in arbitrary horizontal directions.

Figure 1:
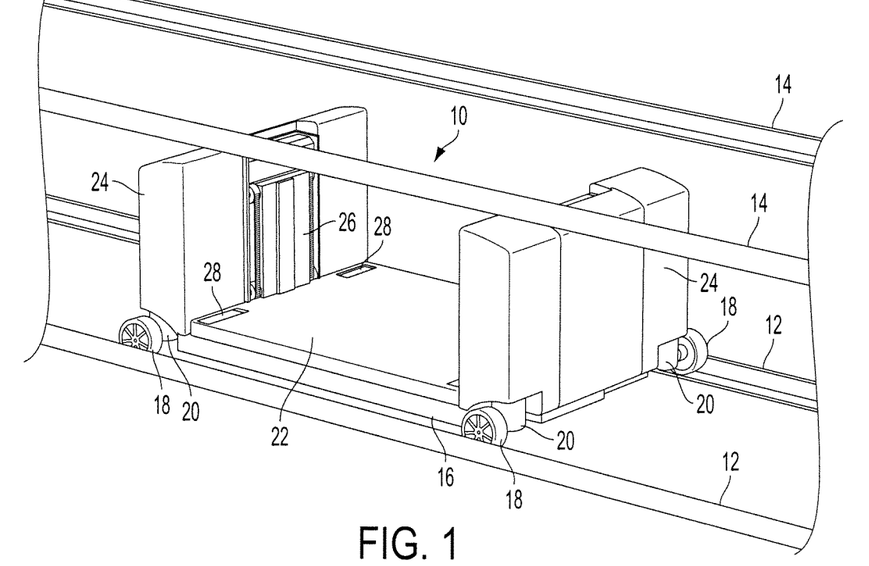
FIG. 1 shows an exemplary embodiment of a robotic device of the present disclosure.

FIG. 1 shows an exemplary embodiment of a robotic device 10 of the present disclosure. The robotic device 10 may move along a pair of rails 12 that extends in a horizontal direction. FIG. 1 shows only rails extending in a single horizontal direction. However, as discussed later, the robotic system of the present disclosure may also include horizontal rails arranged at a desired angle with respect to a direction of the rails 12 shown in FIG. 1. As discussed below, the robotic device 10 may move along the rails arranged in any desired horizontal directions.

The rails 12 may be arranged in multiple rows arranged in a vertical direction on different levels with respect to the ground. FIG. 1 shows a pair of rails 12 on which the robotic device 10 currently stands, and a pair of rails 14 arranged in the next row above the rails 12. For example, the rails 12 and 14 may be L-shaped rails.

The robotic device 10 may have a frame 16 with four wheels 18 attached to the frame 16. The frame 16 may be formed as a braced structure for supporting elements required to operate the robotic device 10. Each wheel 18 may be attached to the frame 16 so as to rotate in a vertical plane about an axis extending from the center of the wheel 18 in order to move the robotic device 10 along the rails.

Four vertical pivots 20 may be used for attaching the respective wheels 18 to the frame so as to turn each wheel 18 in a horizontal plane about the vertical axis of the respective pivot 20. For example, each wheel 18 may be turned in a horizontal plane about 90 degrees with respect to the direction of rails. Each vertical pivot 20 is arranged with respect to the frame 16 so as to make the width of the robotic device 10 with the wheels 18, smaller than a distance between adjacent rails in a direction perpendicular to the direction of the rails, when the wheels 18 are turned into the direction perpendicular to the direction of the rails.

As discussed below, the wheels 18 may be turned in a horizontal plane to support moving the robotic device 10 in the vertical direction, and to support turning the robotic device 10 to a horizontal direction perpendicular to a current horizontal direction of the robotic device 10. Although in an exemplary embodiment, the robotic device 10 has four wheels 18, one skilled in the art would realize that the present concept is applicable to any number of wheels that can be provided to support movement of the robotic device 10.

The frame 16 may hold a movable platform 22 that can be used for carrying loads such as goods delivered by the robotic device 10 in a robotic retail environment. For example, the platform 22 may be a rectangular metal plate configured to accommodate boxes or pallets with goods. Side walls 24 may be provided on the frame 16 to support carrying loads.

As discussed below, the platform 22 may be moved in a vertical direction to support vertical movements of the robotic device 10. Platform lifting mechanisms 26 may be arranged on the side walls 24 for moving the platform 22 up or down in a vertical direction. For example, as shown in FIG. 1, each platform lifting mechanism 26 may be implemented using a belt drive.

Deployable support handles 28 may be attached to the platform 22. FIG. 1 shows the support handles 28 held in an undeployed state in slots formed on the platform 22. As discussed below, the support handles 28 may be L-shaped pins extended from the platform 22 to support moving the robotic device 10 in a vertical direction and changing a horizontal direction of the robotic device 10.

Figure 2:
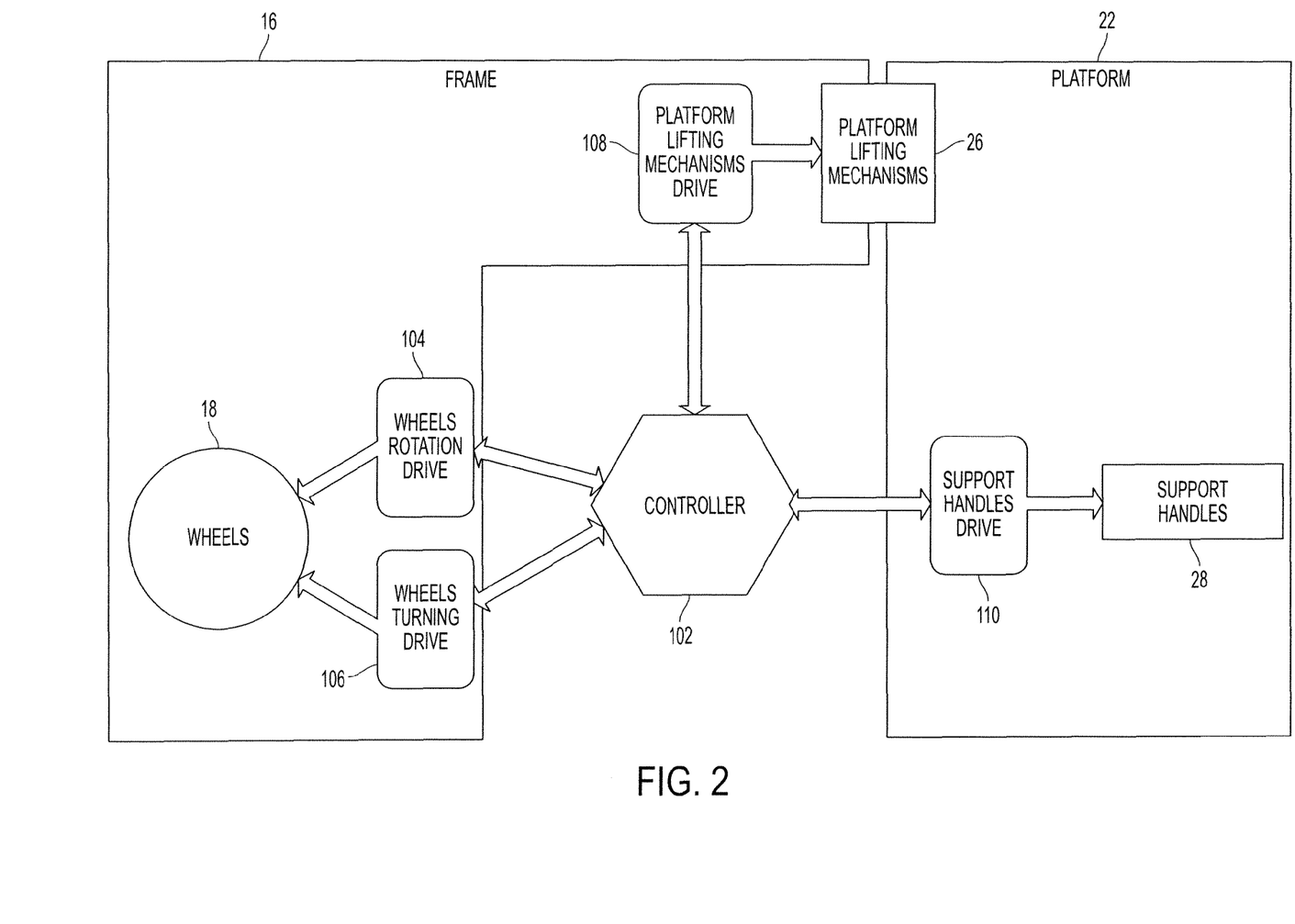
FIG. 2 is a simplified exemplary diagram showing elements for providing operation of the robotic device in FIG. 1.

FIG. 2 is a simplified diagram that illustrates elements for performing various operations performed by the robotic device 10. The operations of the robotic device 10 are controlled by a controller 102 that may include a data processor responsive to external commands for processing the commands and producing various control signals. The controller may have a radio transceiver for providing bidirectional data communications with external objects via a radio network, such as a WiFi network. A controller area network (CAN) bus may connect the controller 102 with various elements of the robotic device 10 to supply control signals to the elements of the robotic device 10 and receive responses.

In particular, the controller 102 may control a wheels rotation drive 104, a wheels turning drive 106, a platform lifting mechanisms drive 108, and a support handles drive 110. The wheels rotation drive 104, wheels turning drive 106 and platform lifting mechanisms drive 108 may be arranged on the frame 16, whereas the support handles drive 110 may be arranged on the movable platform 22. The wheels rotation drive 104 is provided for driving the wheels 18 so as to rotate them in a vertical plane in order to move the robotic device 10 along the rails in a horizontal direction. The wheels turning drive 106 drives the vertical pivots 20 so as to turn the respective wheels 18 in a horizontal plane. The wheels 18 may be turned 90 degrees about the vertical axes of the pivots 20. As one skilled in the art would realize, the wheels drives 104 and 106 may be implemented using any of well known mechanisms for rotating and turning wheels.

The platform lifting mechanisms drive 108 is provided for driving the platform lifting mechanisms 26 that move the platform 22 up and down in a vertical direction. As one skilled in the art would realize, the platform lifting mechanisms 26 and drive 108 may be implemented using any well known mechanisms for moving a plate up and down.

The support handles drive 110 is used for extending the support handles 28 from the slots on the platform 22 when the support handles 28 are required for supporting movements of the robotic device 10, and for hiding the support handles 28 back into the slots on the platform 22 when the support handles 28 are no longer required. The drive 110 may be implemented using any well known mechanism for extending a pin.

Figure 3:
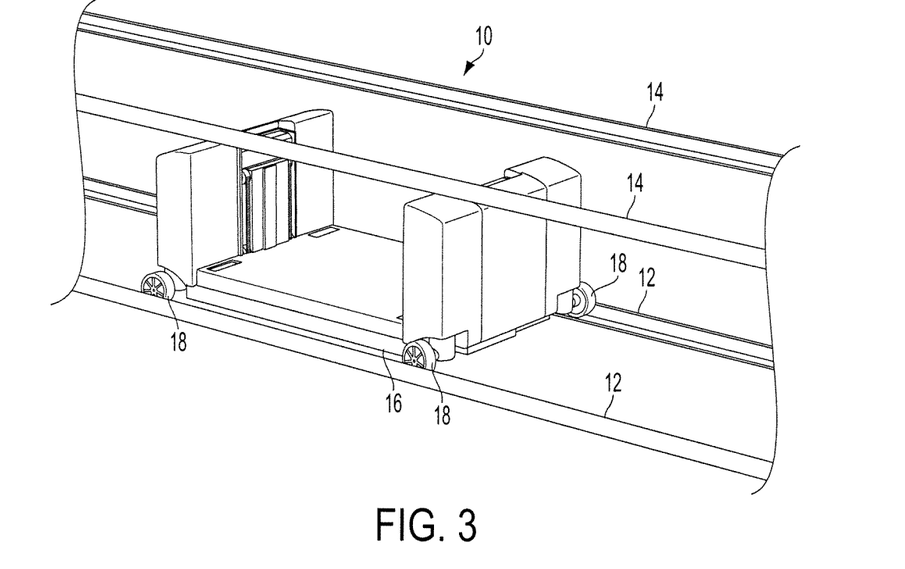
FIGS. 3-9 illustrate exemplary operations performed for moving the robotic device in a vertical direction.
Figure 4:
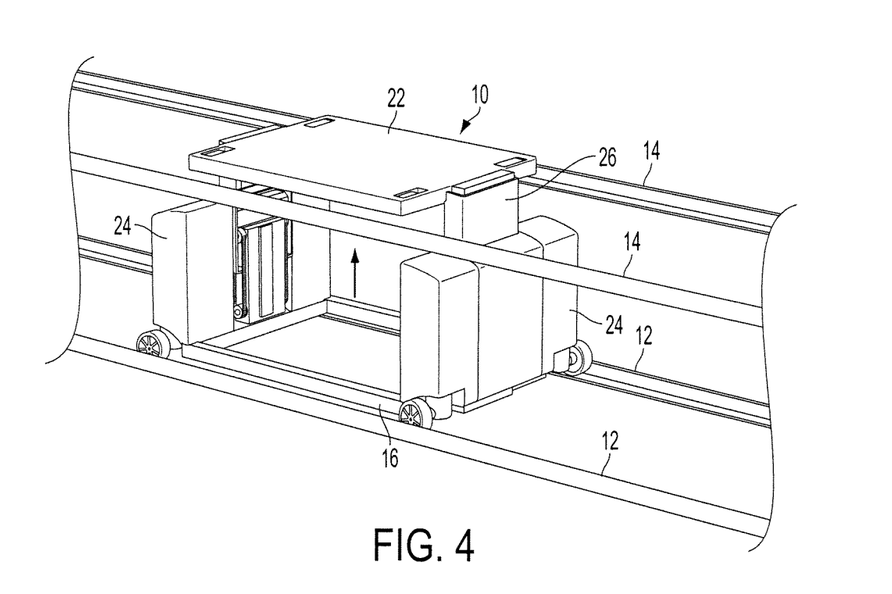

FIGS. 3-9 illustrate operations performed by the robotic device 10 when it moves in a vertical direction. In particular, FIG. 3 shows a robotic device 10 having its wheels 18 standing on the lower rails 12. The platform 22 may be positioned on the frame 16. As illustrated in FIG. 4, at the beginning of the vertical movement, the controller 102 may control the platform lifting mechanisms drive 108 to activate the platform lifting mechanisms 26 at the both side walls 24 so as to raise the platform 22 to a level above the rails 14 provided in the next row of the rails with respect to the rails 12.

Figure 5:
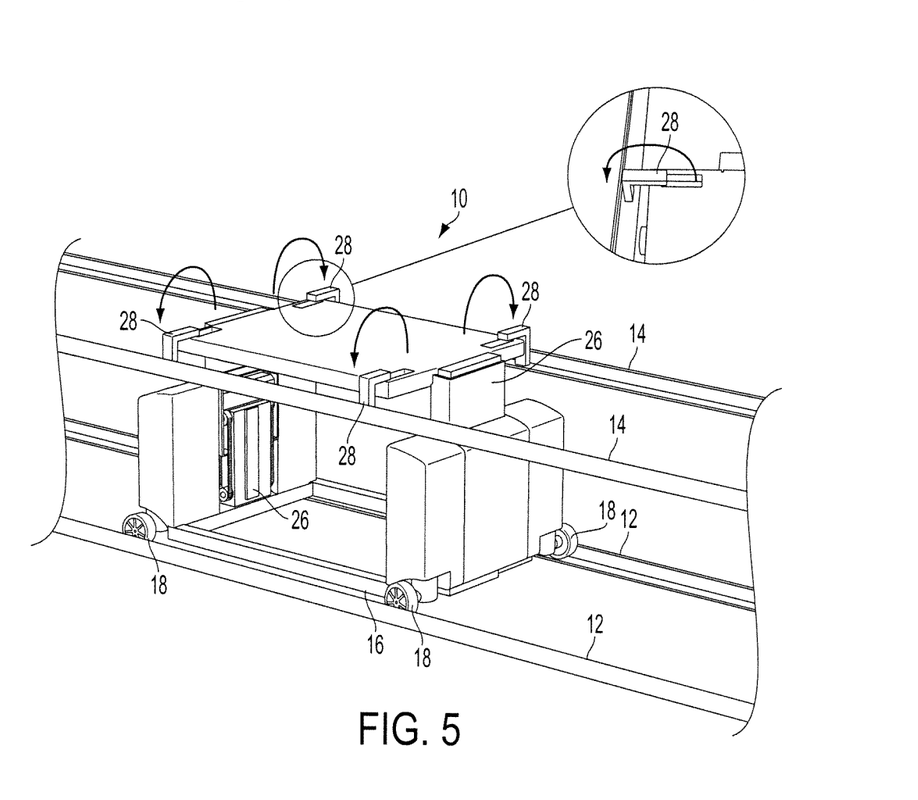

As shown in FIG. 5, after the platform 22 is raised to a desired level above the rails 14 or simultaneously with raising the platform 22, the support handles drive 110 is controlled to deploy the support handles 28. The deployment of the support handles 28 may be provided by extending each of them from the respective slot on the platform 22 to a position directly above the respective rail 14.

For example, each support handle 28 may be implemented as an L-shaped support pin 28 shown in FIG. 5. During the deployment, the support pin 28 may be extended and placed directly above the respective rail 14. Thereafter, the platform 22 is lowered to a lower position so as to engage each support pin 28 with the respective rail 14 and raise the frame 16 with respect to the rails 12 to a level sufficient to disengage the wheels from the rails 12.

Figure 6:
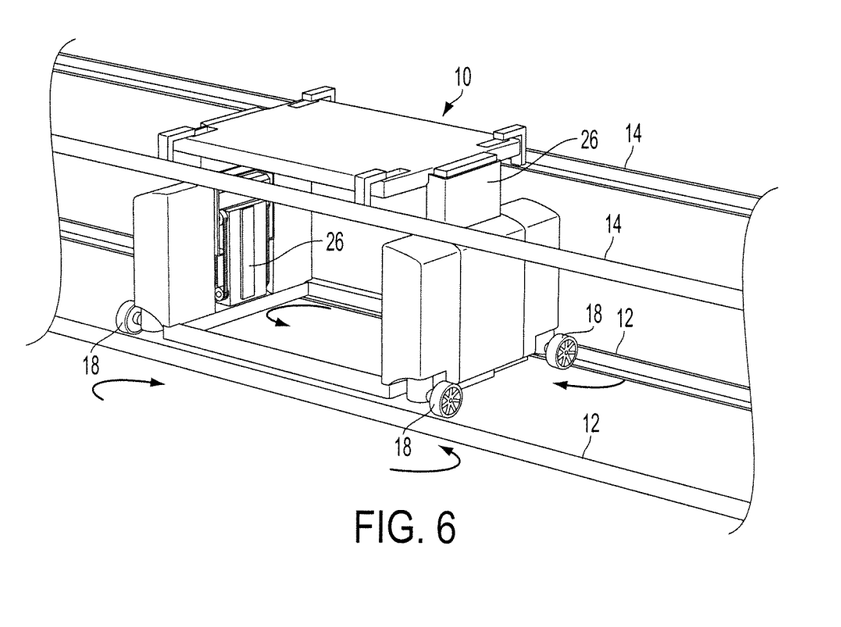

As shown in FIG. 6, when the wheels 18 become disengaged from the rails 12, the wheels turning drive 106 is controlled so as to turn each of the wheels 18 in a horizontal plane using the respective vertical pivots 20. For example, each wheel 18 may be turned about the vertical axis of the pivot 20 by an angle equal to approximately 90 degrees. The position of the vertical pivots 20 with respect to the frame 16 is selected so as to provide the maximum distance between the edges of the turned wheels 18 in a direction perpendicular to the direction of the rails, smaller than the distance between the rails in the horizontal direction.

Figure 7:
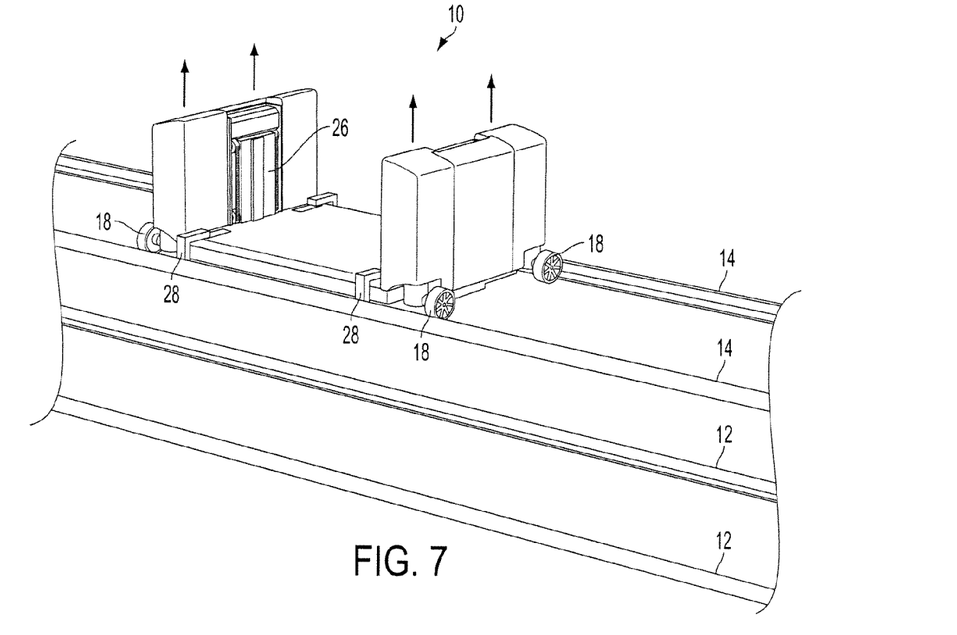

As shown in FIG. 7, the support handles 28 fix the platform 22 on the rail 14 so as to enable the platform lifting mechanisms 26 to lift the frame 16 when the platform lifting mechanisms 26 is controlled by the platform lifting mechanisms drive 108 to reduce the distance between the platform 22 and the frame 16 in a vertical direction. The frame 16 may be lifted to a level above the rails 14 so as to place the platform 22 on the frame 16. As the distance between the edges of the turned wheels 18 is less than the distance between the rails 14 in a direction perpendicular to the direction of the rails 14, the frame 16 with the wheels 18 can be transferred in the space between a pair of the horizontal rails 14.

Figure 8:
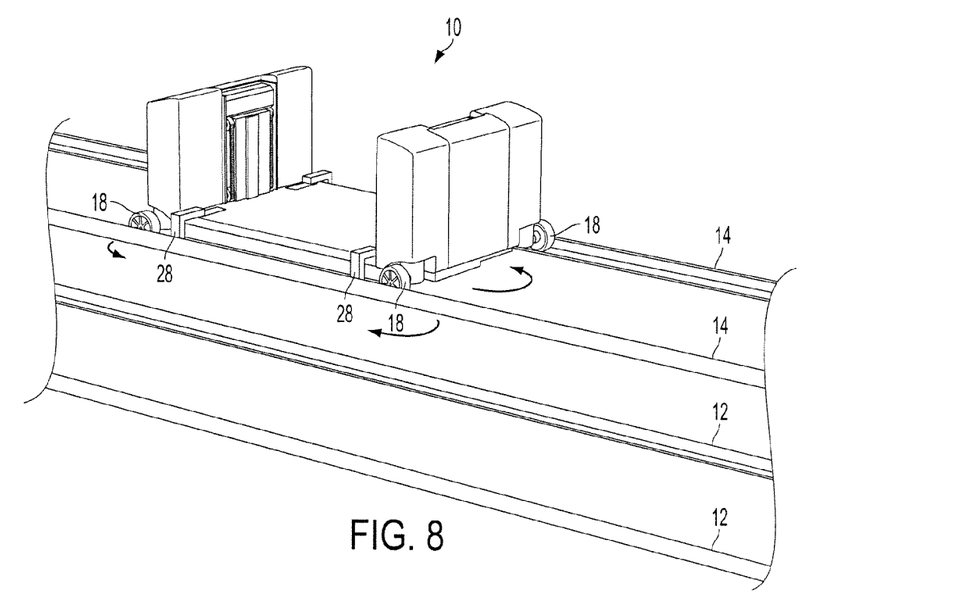

As shown in FIG. 8, when the frame 16 is raised to a desired position above the rails 14, the wheel turning drive 106 is controlled to turn the wheels 18 using the respective vertical pivots 20 so as to return each wheel 18 to an initial position along the rails.

Figure 9:
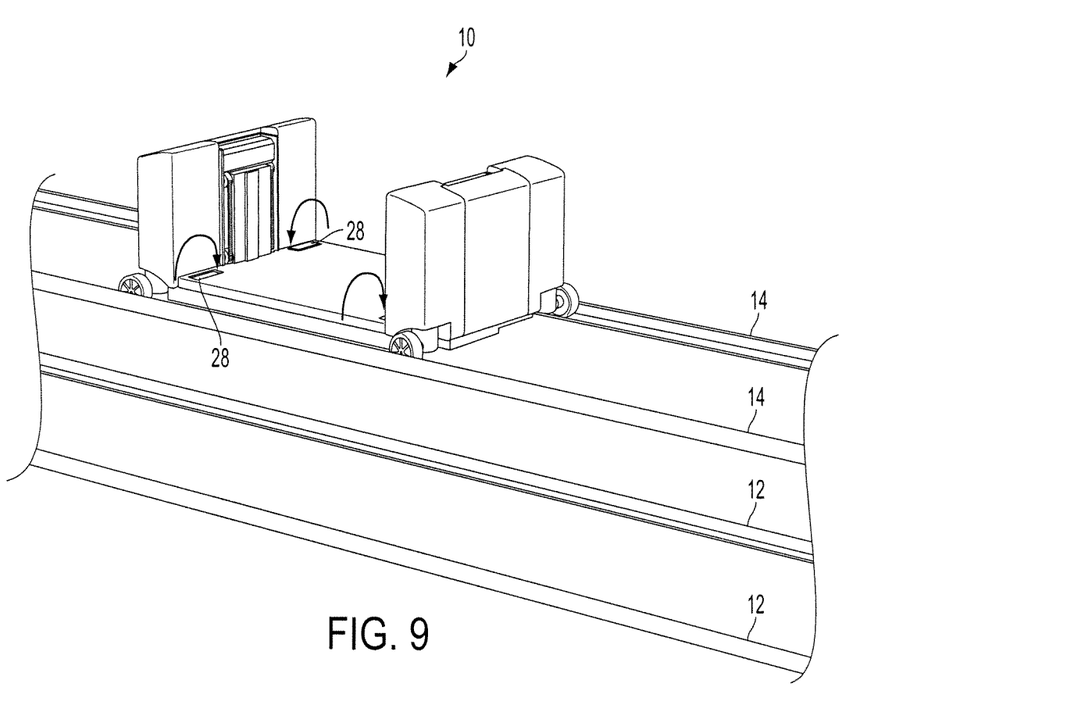

Thereafter, as shown in FIG. 9, the support handles 28 may be removed from the rails 14 and placed in the respective slots on the platform 22. As a result, the frame 16 is lowered so as to place the wheels 18 on the rails 14.

Hence, the robotic device 10 standing on lower rails 12 can lift itself in a vertical direction to a level of higher rails 14 in the next row of rails so as to continue movement along the rails 14. As one skilled in the art would realize, a similar technique can be used to move the robotic device 10 down in a vertical direction from higher rails 14 to lower rails 12 in the next row of the rails. No external lifting device is required for moving the robotic device up or down in a vertical direction.

Figure 10:
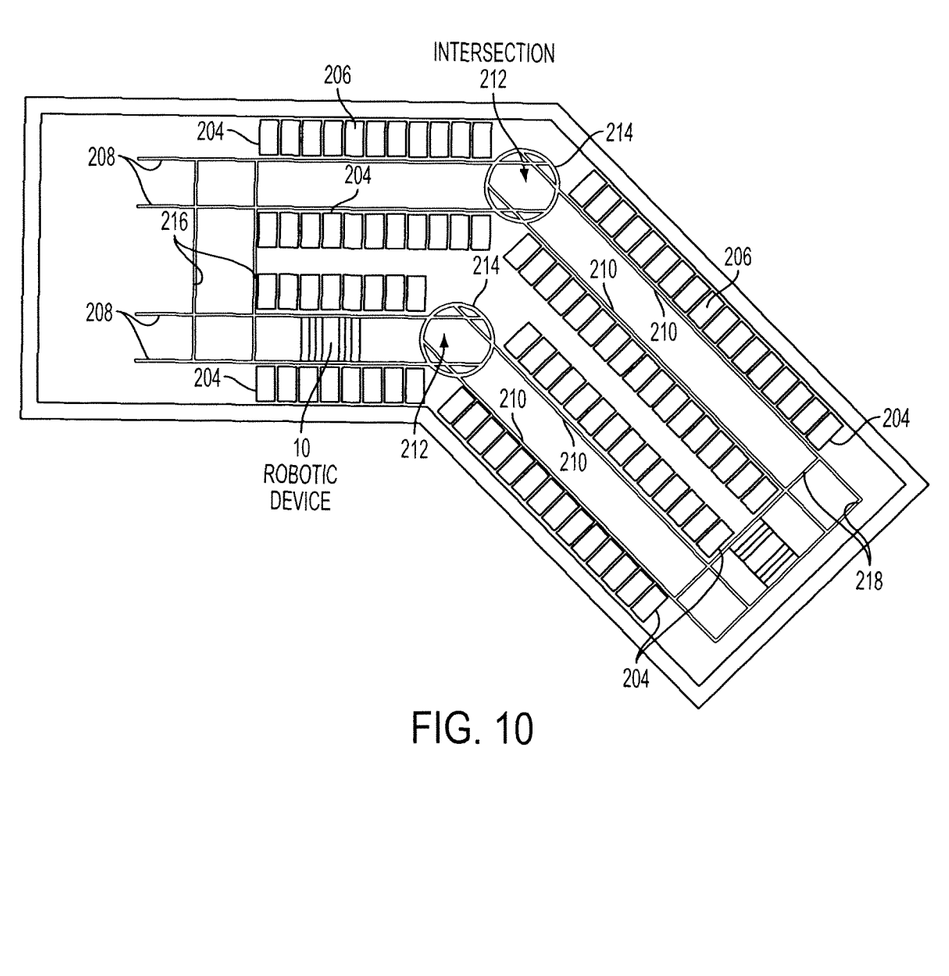
FIG. 10 illustrates an exemplary floor plan of a storage facility, in which a robotic device of the present disclosure may operate.

FIG. 10 illustrates an exemplary floor plan of a storage facility, in which the robotic device 10 may operate. The storage facility may have multiple storage racks 204, each of which includes storage cells 206 arranged in multiple horizontal rows and multiple vertical columns. FIG. 10 shows a storage facility arranged in a non-rectangular space. To accommodate a non-rectangular space, sections of the storage racks 204 may be arranged along various horizontal directions including mutually non-orthogonal directions.

Pairs of horizontal rails 208 and 210 may be arranged in horizontal rows corresponding to the rows of the storage cells 206, at different levels with respect to the ground corresponding to the columns of the storage cells 206. The horizontal rails 208 and 210 may be arranged at any desired angle with respect to each other. The angle between the rails 208 and 210 may differ from 90 degrees and may be selected based on the arrangement of the storage racks 204 so as to provide the robotic device 10 with access to storage cells 206 of all storage racks 204.

Rail intersections 212 are arranged at places where the rails 208 and 210 meet. Circular rails 214 may be provided at the intersections 212 to enable the robotic device to move between the rails 208 and 210. Also, the robotic system may include rails 216 perpendicular to the rails 208 and rails 218 perpendicular to the rails 210 for enabling the robotic device 10 to move in a horizontal direction from one pair of the rails 208 to the other, and from one pair of the rails 210 to the other.

Figure 11:
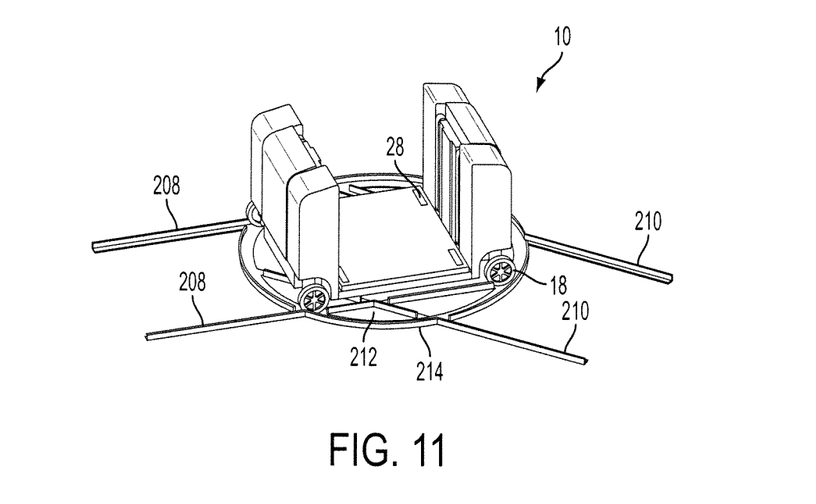
FIGS. 11-18 illustrate exemplary operations performed for changing a horizontal direction of the robotic device.

FIGS. 11-18 illustrate operations performed by the robotic device 10 to turn from one horizontal direction to another horizontal direction. For example, FIG. 10 schematically shows the robotic device 10 moving along the rails 208 to the intersection 212 with the rails 210. As shown in FIG. 11, the robotic device 10 may be controlled by the controller 102 to stop at the intersection 212 so as to position the wheels 18 of the robotic device 10 at the circular rail 214.

Figure 12:
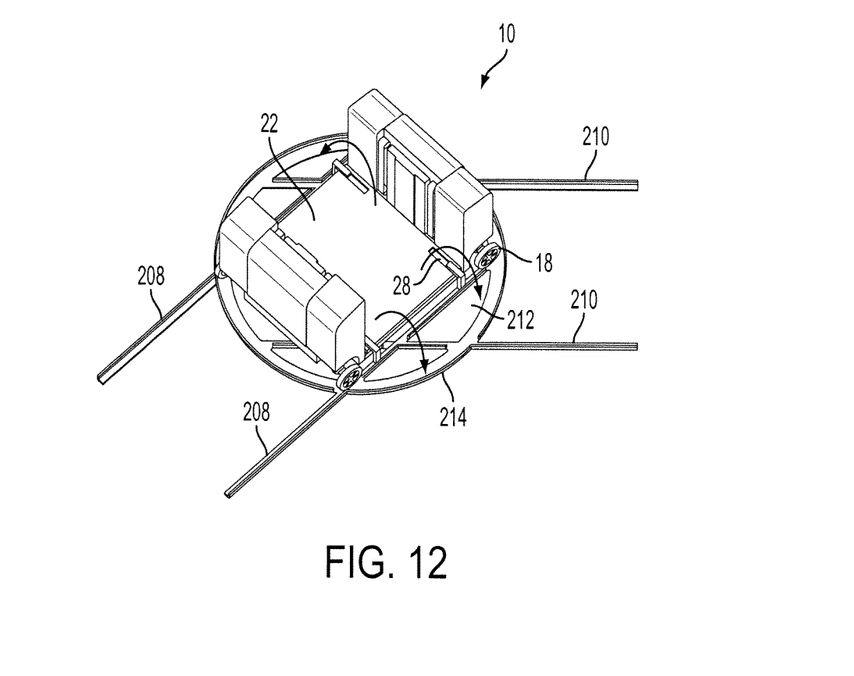

As shown in FIG. 12, when the robotic device 10 is stopped, the support handle drive 110 is controlled to deploy the support handles 28. The deployment of the support handles 28 may be provided by extending them so as to push against the rail 208. When the support handles 28 push against the rails 208, the robotic device 10 becomes slightly raised above the rails 208 so as to disengage the wheels 18 from the rails 208.

Figure 13:
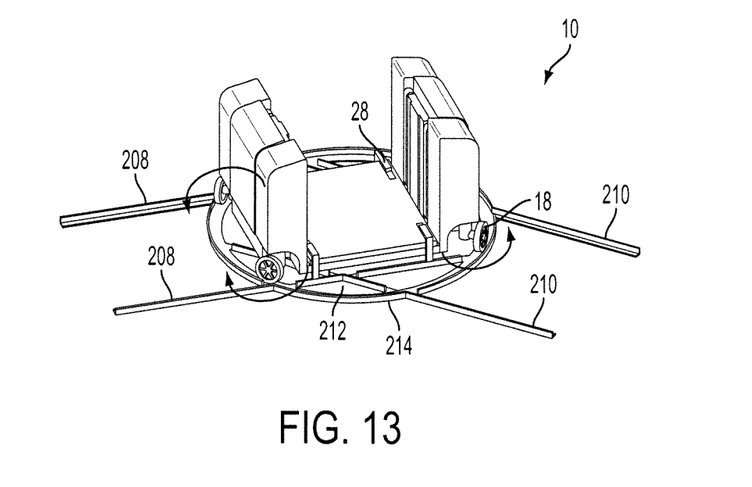

As shown in FIG. 13, when the wheels 18 are disengaged from the rails 208, the wheels turning drive 106 is activated to turn the wheels 18 in a horizontal plane using the vertical pivots 20. Each wheel 18 may be turned by an angle determined based on the dimensions of the robotic device 10 to position the wheels 18 for movement along the rail 214.

For example, if the width and the length of the robotic device 10 are about the same, the wheels 18 may be turned approximately 45 degrees about the vertical axes of the pivots 20. As shown in FIG. 13, the wheels 18 positioned above each rail 208 may be turned in opposite direction—one of the wheels 18 may be turned in a clockwise direction by approximately 45 degrees, while the other wheel 18 above the same rail may be turned in a counter-clockwise direction by approximately 45 degrees.

Figure 14:
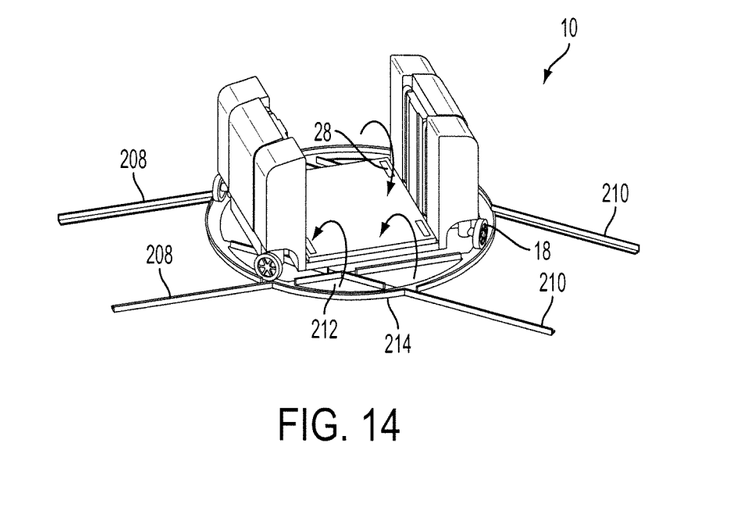

As shown in FIG. 14, after the wheels 18 are turned in a horizontal plane, the support handles drive 110 is controlled to remove the support handles 28. As a result, the wheels 18 are placed onto the circular rail 214 so as to enable the robotic device 10 to move along the rail 214.

Figure 15:
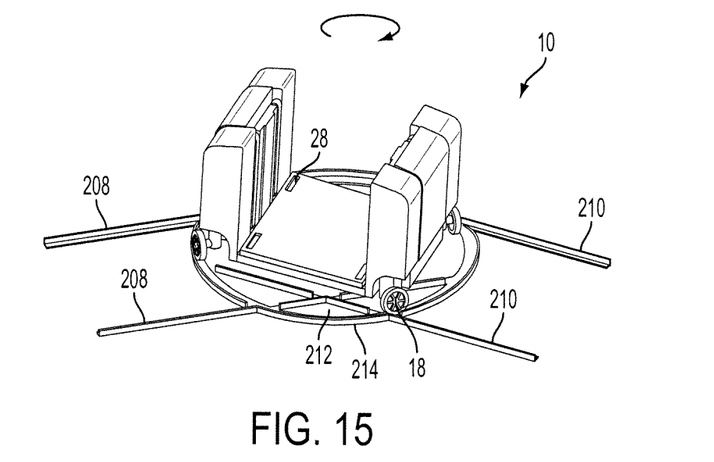
Figure 16:
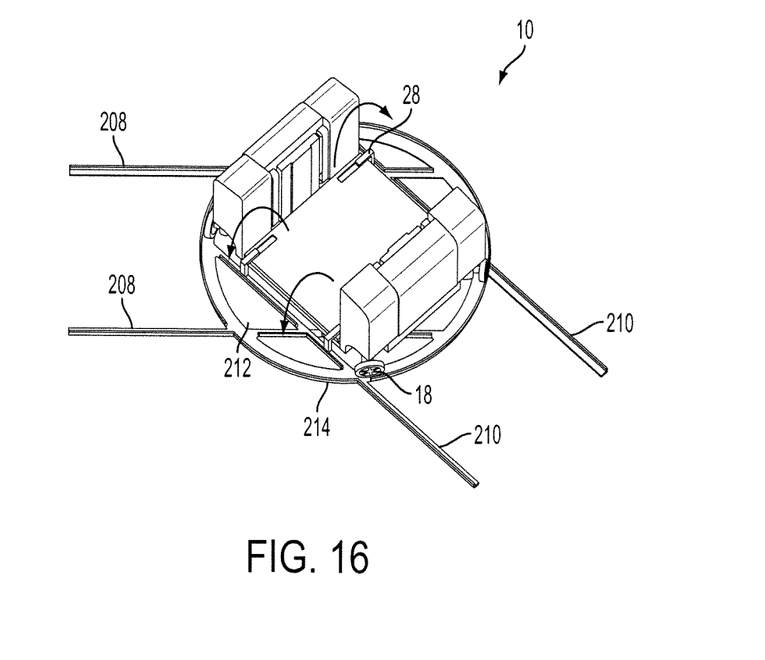

As shown in FIG. 15, the robotic device 10 may move along the rail 214 until the wheels 18 reach the intersection points where the rail 214 meets the pair of rails 210. As shown in FIG. 16, when these intersection points are reached, the controller 102 controls the support handles drive 110 to deploy the support handles 28 so as to engage them with the rails 210. When the support handles 28 push against the rails 210, the robotic device 10 becomes slightly raised above the rail 214 so as to disengage the wheels 18 from the rail 214.

Figure 17:
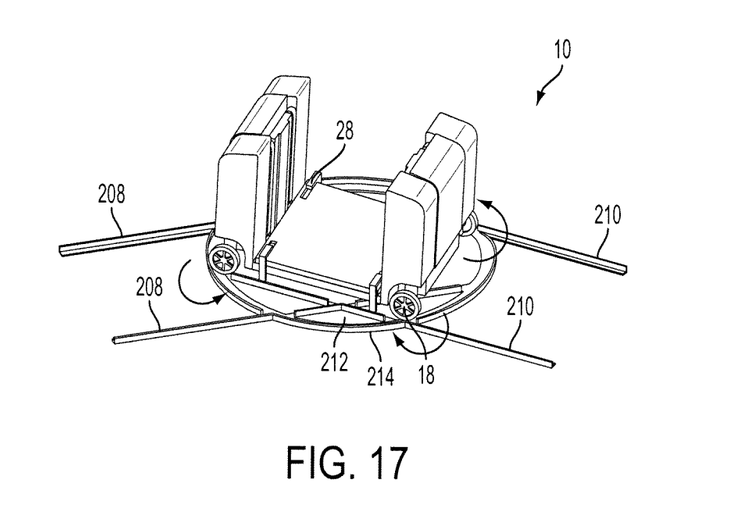
Figure 18:
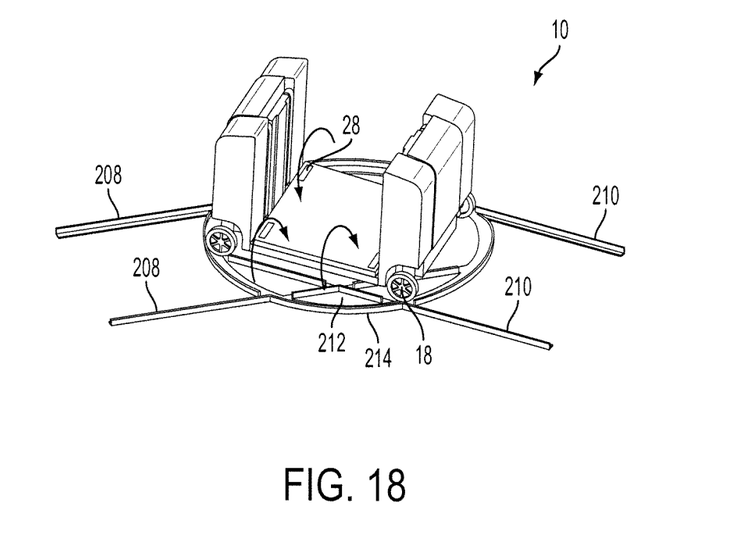

As shown in FIG. 17, when the wheels 18 are disengaged from the rails 214, the wheels turning drive 106 is controlled to turn the wheels 18 in a horizontal plane using the pivots 20 so as align the wheels 18 with the rails 210. Thereafter, as shown in FIG. 18, the support handles drive 110 is controlled to remove the support handles 28 so as to place the robotic device 10 on the rails 210. As a result, the robotic device 10 is enabled to move along the rails 210.

Hence, the support handles 28 configured for self lifting the robotic device 10 in a vertical direction are also configured to enable the robotic device 10 to turn between any desired horizontal directions so as to have access to the storage stacks 204 arranged along different horizontal directions.

FIGS. 11-18 illustrate turning the robotic device 10 between mutually non-orthogonal horizontal directions of the rails 208 and 210. However, as one skilled in the art would realize, the support handles 28 may enable the robotic device 10 to turn into a perpendicular horizontal direction, for example, when the robotic device 10 turns from the rails 208 to the rails 216 in FIG. 10. Turning the robotic device into a perpendicular direction is discussed in more detail in my copending U.S. patent application Ser. No. 13/546,492 filed on Jul. 11, 2012 entitled "ROBOTIC DEVICE MOVABLE IN THREE MUTUALLY PERPENDICULAR DIRECTIONS" and incorporated herewith by reference.

The foregoing description illustrates and describes aspects of the present invention. Additionally, the disclosure shows and describes only preferred embodiments, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art.

The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein.

What is claimed is:

1. A robotic device movable in a vertical direction and in prescribed horizontal directions along rails arranged in the prescribed horizontal directions in multiple rows provided at various levels with respect to ground, the robotic device comprising:
   a frame,
   wheels coupled to the frame and configured for moving the frame along the rails, and
   support handles for lifting the frame in the vertical direction from first rails arranged in a first row of the rails to second rails arranged in a second row of the rails,
   the support handles being configured for providing engagement with the second rails to lift the robotic device in the vertical direction, and for turning the frame into a desired horizontal direction by pushing against the second rails on an intersection between the second rails and third rails arranged in the same row as the second rails.

2. The device of claim 1, wherein the support handles are configured for raising the frame with respect to the second rails when the support handles push against the second rails.

3. The device of claim 2, further comprising a wheels turning mechanism for turning the wheels with respect to a direction of the second rails when the frame is raised with respect to the second rails.

4. The device of claim 3, wherein the wheels turning mechanism is configured for turning the wheels by angles determined based on dimensions of the robotic device so as to position the wheels for movement along an auxiliary rail provided at the intersection between the second rails and the third rails.

5. The device of claim 4, wherein the wheels are placed onto the auxiliary rail when the support handles stop pushing against the second rail.

6. The device of claim 5, wherein the frame is controlled to move along the auxiliary rail until the wheels reach intersection points where the auxiliary rail meets the third rails.

7. The device of claim 6, wherein the support handles are configured to push against the third rails when the wheels reach the intersection points where the auxiliary rail meets the third rails.

8. The device of claim 7, wherein the support handles are configured for raising the frame with respect to the third rails when the support handles push against the third rails.

9. The device of claim 8, wherein the wheels turning mechanism is configured for turning the wheels with respect to the auxiliary rail to position the wheels for movement along the third rails.

10. The device of claim 1, wherein the support handles are provided on a platform movable in the third direction and configured for transferring the frame in the third direction when the support handles are engaged with the second rails.

11. The device of claim 10, wherein each of the support handles includes an L-shaped pin attached to the movable platform.

12. A method of operating a robotic device having a frame with wheels, and support handles, the method comprising the steps of:
   rotating the wheels for moving the frame on first rails in a first horizontal direction,
   engaging the support handles with second rails arranged in the first horizontal direction above the first rails,
   moving the frame in a vertical direction using the support handles engaged with the second rails so as to place the wheels on the second rails,
   rotating the wheels for moving the frame on the second rails to an intersection between the second rails and third rails arranged in a second horizontal direction,
   operating the support handles to push against the second rails so as to raise the frame above the second rails, and
   turning the wheels to move the frame onto the third rails.

13. The method of claim 12, further comprising the step of turning the wheels with respect to a direction of the second rails when the frame is raised with respect to the second rails.

14. The method of claim 13, wherein the wheels are turned by angles determined based on dimensions of the robotic device to position the wheels for movement along an auxiliary rail provided at the intersection between the second rails and the third rails.

15. The method of claim 14, further comprising the step of placing the wheels onto the auxiliary rail when the support handles stop pushing against the second rail.

16. The method of claim 15, further comprising the step of controlling the frame to move along the auxiliary rail until the wheels reach intersection points where the auxiliary rail meets the third rails.

17. The method of claim 16, further comprising the step of pushing against the third rails using the support handles when the wheels reach the intersection points where the auxiliary rail meets the third rails.

18. The method of claim 17, wherein the frame is raised with respect to the third rails when the support handles push against the third rails.

19. The method of claim 18, further comprising the step of turning the wheels with respect to the auxiliary rail to position the wheels for movement along the third rails.

* * * * *